(12) United States Patent
Drozt et al.

(10) Patent No.: US 8,474,007 B2
(45) Date of Patent: *Jun. 25, 2013

(54) SYSTEM AND METHOD OF CONTROLLING IDENTITY PRIVACY IN A COMMUNICATION SESSION

(75) Inventors: Peter M. Drozt, Prairie Grove, IL (US); Anatoly Agulnik, Deerfield, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/645,708

(22) Filed: Dec. 23, 2009

(65) Prior Publication Data

US 2011/0154446 A1 Jun. 23, 2011

(51) Int. Cl.
*H04L 9/00* (2006.01)
(52) U.S. Cl.
USPC .............................................................. 726/1
(58) Field of Classification Search
USPC ...................................................... 726/1, 2, 4
See application file for complete search history.

(56) References Cited

U.S. PATENT DOCUMENTS

2005/0276268 A1* 12/2005 Poikselka et al. .......... 370/395.2
2006/0140200 A1   6/2006 Black
2006/0234692 A1* 10/2006 Shimokawa et al. ......... 455/418
2008/0037574 A1*  2/2008 Huh et al. .................... 370/416
2010/0234057 A1   9/2010 Drozt et al.

FOREIGN PATENT DOCUMENTS

| WO | 2005122470 A1 | 12/2005 |
| WO | WO2008018681 A1 | 2/2008 |
| WO | 2010104668 A2 | 9/2010 |

OTHER PUBLICATIONS

PCT International Search Report Dated Apr. 27, 2011 for Counterpart Application.
Peter Saint-Andre, "XEP-0045: Multi-User Chat", Jul. 16, 2008, p. 1-126; XP002631740.
Push-To-Talk Over Cellular (PoC ); Architecture; PoC Release 2.0 2004-2006.

* cited by examiner

*Primary Examiner* — Ellen Tran
(74) *Attorney, Agent, or Firm* — Steven A. May (57) ABSTRACT

A system and methods for controlling identity privacy in a communication session include processing, at a communication server, a request from a first participant of the communication session to add a second participant to the communication session. Based on the request, the communication server establishes a set of privacy rules related to the second participant that control sharing of identity information between the second participant and a third participant of the communication session.

18 Claims, 7 Drawing Sheets

XML Source Example 1

```
<?xml version="1.0" encoding="UTF-8"?>
<privacy_control xmlns="urn : xxx : yyy : zzz : privacy_control ">
    <share>
        <user>user1@domain.com</user>      ⎫
        <user>user2@domain.com</user>      ⎬ 702
    </share>                               ⎭
    <show>
        <user>user1@domain.com</user>      ⎫
        <user>user2@domain.com</user>      ⎬ 704
        <user>user3@domain.com</user>      ⎭
    </show>
</privacy_control>
```

FIG. 7

XML Source Example 2

```
<?xml version="1.0" encoding="UTF-8"?>
<privacy_control xmlns="urn : xxx : yyy : zzz : privacy_control ">
    <share>
        <group>detectives@domain.com</group>      ⎫
        <group>department123@domain.com</group>   ⎬ 802
    </share>                                      ⎭
    <show>
        <group>department123@domain.com</group>   ⎬ 804
    </show>
</privacy_control>
```

XML Source Example 3

```
<?xml version="1.0" encoding="UTF-8"?>
<privacy_control xmlns="urn : xxx : yyy : zzz : privacy_control ">
902 ⟶    <profile>limited</profile>
</privacy_control>
```

US 8,474,007 B2

SYSTEM AND METHOD OF CONTROLLING IDENTITY PRIVACY IN A COMMUNICATION SESSION

REFERENCE TO RELATED APPLICATIONS

The present application is related to the following U.S. applications commonly owned together with this application by Motorola, Inc.:

Ser. No. 12/402,766, filed Mar. 12, 2009, titled "METHOD AND DEVICE FOR ENABLING SELECTIVE PRIVACY IN A PUSH TO TALK (PTT) WIRELESS GROUP COMMUNICATION SESSION" by Drort, et al.

TECHNICAL FIELD

The present disclosure relates generally to communication systems and in particular to a system and method of controlling privacy in a communication session.

BACKGROUND

While within range of one another, portable radio transceivers or "walkie-talkies" quickly establish one-to-one and one-to-many communication links. Such radio transceivers are indispensable for law enforcement, rescue, and military personnel, and have even become commonplace across various business environments as well as for recreational activities. In particular, radio transceivers provide a near instantaneous connection between users in a talk group by utilizing push to talk (PTT) communications over a half-duplex radio transmission system, for example, over a circuit-switched network. Half-duplex radio transmission systems provide two-way communication on a single radio channel thus limiting speaking privileges to one user at a time. Therefore, requests to speak in a PTT communication session are handled by a floor control mechanism at a PTT server.

Recent advances in cellular packet-switched networks have resulted in the development of a push to talk over cellular (PoC) solution, for example, as described in PoC V1.0.3 Enabler Package released September 2009 by Open Mobile Alliance (OMA). Specifically, a PoC network provides a half-duplex voice over internet protocol (VoIP) solution, with well-known PTT functionality. PoC is implemented on an internet protocol multimedia subsystem (IMS) platform, as described in 3GPP Technical Specification (TS) 23.228, and any subsequent revisions. The floor control mechanism in a PoC system resides in a PoC server above the IMS platform. Moreover, PoC employs familiar protocols for voice and control signaling, including Real-Time Transport Protocol (RTP), as described, for example, in Request for Comments (RFC) 3550 dated July 2003 by Internet Engineering Task Force (IETF), and any subsequent revisions, and Session Initiation Protocol (SIP), for example, as described in RFC 3261 published June 2002 by IETF Network Working Group and any subsequent revisions.

In various circumstances during a communication session, such as during a PoC communication session or during any other type of communication session that supports a privacy feature, it is desirable for a participant of the communication session to hide the participant's identity from other participants of the communication session. The OMA PoC standards define an ability of a group participant to request anonymity when initiating or joining a communication session. However, the industry's standards do not provide mechanisms for controlling privacy of a participant that is added to a communication session.

Accordingly, there is a need for a system and method of controlling identity privacy in a communication session.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method of controlling identity privacy in a communication session, such as in a PTT communication session. Illustrative embodiments of the present disclosure are described below with reference to PTT communication within a PoC system. However, at least some of the illustrative embodiments, and their associated advantages, can be implemented and appreciated in a variety of other communication systems capable of supporting the systems and methods as described herein.

As used herein, the terms "identity" or "identity information" refers to data used to define or distinguish one participant apart from another and can include, but is not limited to, a participant's attributes, characteristics, designations, name, unique identifier, and other participant related information. Also, as used herein, the terms "privacy", "identity privacy", and "privacy rules" refer to rules or protocols for controlling how an added participant's identity is shared with or provided to other participants during a communication session. A "communication session" means a relationship between participants that is established using call control protocols (such as SIP, for instance, or any other standard or proprietary call control protocol), wherein the established relationship is used to exchange media (e.g., voice, data, video, and the like) between the participants. Also, as used in the context of this disclosure, a "participant" refers to any combination of one or more users of user equipment (UE). The participants can be members of a group or "talk group" that include a plurality of preconfigured or ad hoc users or members, or may not be members of such groups. Further, each participant engages in a communication session by way of any combination of UE comprising hardware and software and/or firmware as discussed below.

As described herein, methods for controlling identity privacy in a communication session include processing a request from a first participant of the communication session to add a second participant to the communication session. The request is received and processed at a communication server, which, based on the request from the first participant, establishes a set of privacy rules related to the second participant that control sharing of identity information between the second participant and other participants of the communication session.

Other methods for sharing participant identity information in a communication session include a first participant (using his/her user equipment) inviting a second participant to the communication session. The first participant (using his/her user equipment) also directs a communication server to establish a set of privacy rules related to the second participant, which control sharing of identity information between the second participant and at least one other participant of the communication session.

A system for controlling privacy in a communication session as disclosed herein includes a database, and interface, and a processing device. The database maintains identity information for a plurality of participants of the communication session. The interface receives a request, from a first active participant of the plurality of participants, to include an additional participant in the communication session. The processing device, responsive to receiving the request, establishes a set of privacy rules related to the additional participant, which control sharing of identity information between the additional participant and at least one other active participant of the plurality of participants.

The systems and methods of controlling identity privacy in a communication session, as described in this disclosure, are compliant with established standards and protocols, such as OMA PoC, RTP, and SIP. However, the embodiments of the present disclosure are not limited by these protocols. At times, illustrative embodiments of the present disclosure are described with reference to an individual user or a few users for the sake of clarity in understanding the embodiment; however, the embodiments as disclosed herein can generally be applied to any arbitrary number of users and/or groups of users, including predetermined lists of users, predetermined or preconfigured groups of users and/or groups of groups, and ad hoc groups. Further, the benefits and advantages as described herein are applicable to any combination of servers, networks, participants, and other devices comprising hardware and software and/or firmware that are capable of supporting the embodiments disclosed below. Those skilled in the art will realize that the above recognized advantages and other advantages described herein are merely illustrative and are not meant to be a complete rendering of all of the advantages of the various embodiments.

Figure 1:
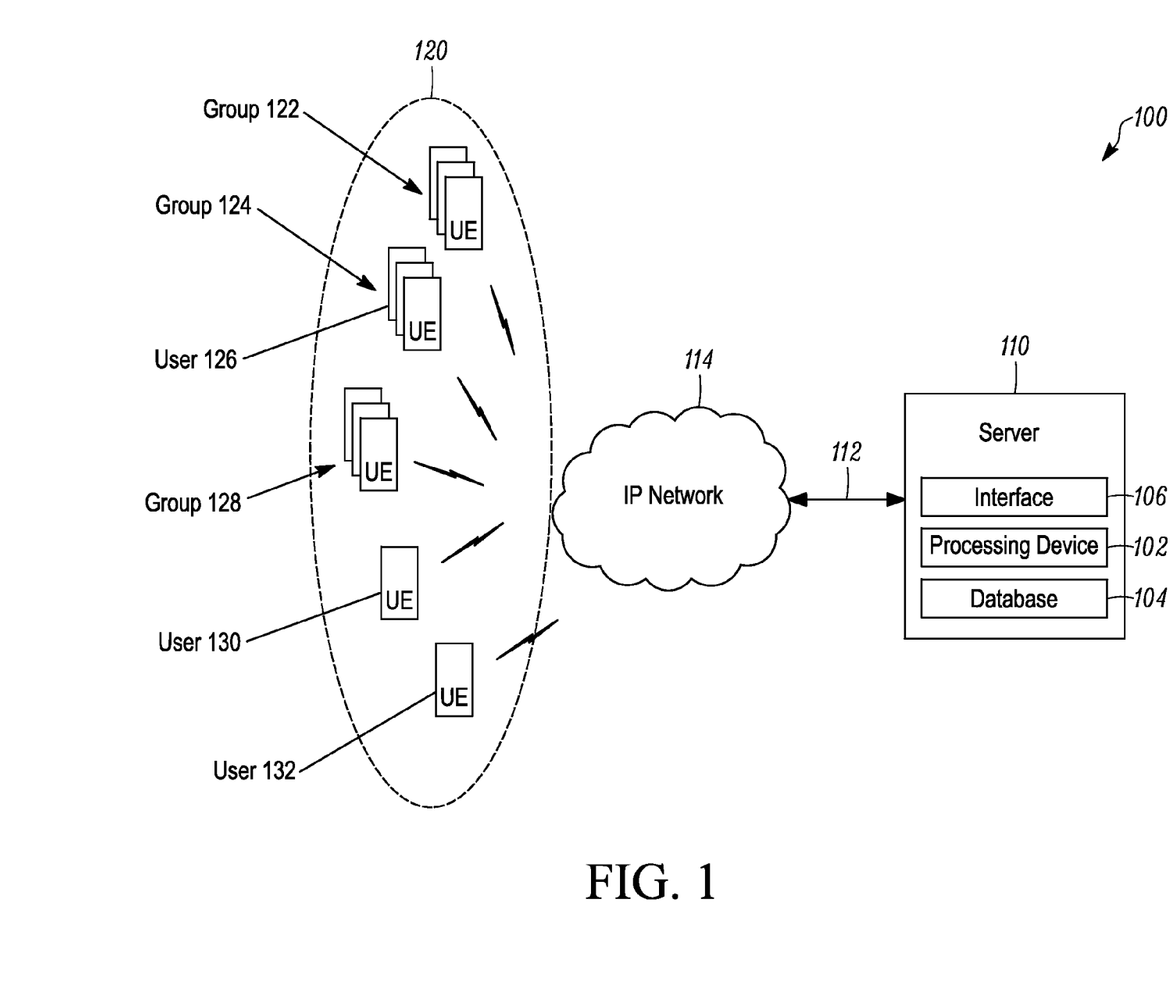
FIG. 1 illustrates a communication system in accordance with illustrative embodiments of the present disclosure.

Referring now to the figures, FIG. 1 shows a communication system 100 capable of supporting a PTT communication session and illustrates a general depiction of a physical implementation of various embodiments of the present disclosure. The communication system 100 comprises a communication server 110 communicating with participants 120 (e.g., users using their UE) over a network 114 (in this illustrative embodiment an internet protocol-based network).

Devices in communication system, including the communication server, the UE (used by the participants) and infrastructure devices (not shown) in the IP network, generally comprises a memory, one or more network interfaces, and a processing device or processor that are operatively coupled, and which when programmed form the means for the device to implement its functionality. The network interfaces are used to send information to and receive information from other devices in the network for carrying out a device's intended functionality.

The implementation of the network interfaces in a given device depends on the particular type of network, i.e., wired and/or wireless, to which the device is connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processor of the particular device through programmed logic such as software applications or firmware stored on the memory of the device.

Besides the above-mentioned functionality, implemented via programmed logic or code, the processor of a given device is further programmed with logic or code for performing signaling and functionality to facilitate methods in accordance with the teachings herein, such as methods described by reference to FIGS. 2 through 9; and/or the processing device may be implemented as a state machine or ASIC. The memory in a device can include short-term and/or long-term storage of various data needed for the functioning of the device and its intended functionality.

Turning now to a description of the various elements shown in communication device 100 starting with the communication server 110, which include a processing device 102, memory (e.g., a database) 104, and an interface 106. Generally, the communication server 110 administers one or more communication sessions. For example, the communication server 110 facilitates floor control and media flow with a plurality of participants engaged in one or more PTT communication sessions. In some embodiments, the database 104 includes information related to participants, such as identity information. Illustratively, the database 104 includes, among others, participant attributes or participant identity information such as an agency name with which the participant is affiliated, a rank, a role, a privacy setting, group membership information, and any other attribute, designation, or participant related identity information. In other embodiments, the database 104 includes, among others, a privacy profile and a privacy list such as a permitted list and a non-permitted list.

In various embodiments, a set of privacy rules is established by the processor 102 based, at least in part, on the participant identity information, the privacy profile, and the privacy list. The set of privacy rules is used for controlling how a participant's identity information is shared with other participants during a communication session. In some embodiments, portions of the participant identity information, the privacy profiles, the privacy lists, and the privacy rules are stored in one or more extensible markup language (XML) documents within the database 104.

Generally, the communication system 100 comprises a system capable of providing PTT communication, whereas the communication server 110 implements an identity privacy function. Thus, the communication server 110 includes any type of server capable of controlling how a participant's identity is shared with other participants during a communication session. For example, in some embodiments, the communication system 100 comprises a PoC system, and the communication server 110 comprises a PoC server.

As indicated by an arrow 112, the communication server 110 is coupled to the network 114. In various embodiments, the network 114 includes an internet protocol (IP)-based radio access network (IP-based RAN), a local area network (LAN)/wide area network (WAN) Enterprise or IMS environment.

Further, the network 114 features any combination of network connectivity devices such as modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), time division multiple access (TDMA) and global system for mobile communications (GSM) radio transceiver cards, and other network devices. These network connectivity devices permit the network 114 to communicate with a global information system, an intranet, or a plurality of intranets. In some embodiments, the network 114 comprises a broadband network implemented by way of a digital subscriber line (DSL), an integrated service digital network (ISDN), a T-1 line, a satellite connection, an EV-DO connection, or a Worldwide Interoperability for Microwave Access (WiMAX) connection, among others.

Moreover, the network 114 includes a host of infrastructure devices for facilitating PTT communications between the participants' UE and between the UE and the communication server 110. Examples of such infrastructure devices include, but are not limited to, devices commonly referred to as bridges, switches, zone controllers, base station controllers, repeaters, base radios, base transceiver stations, base stations, access points, routers or any other type of infrastructure equipment facilitating communications between entities in a wireless or wired environment.

Returning to FIG. 1, a plurality of participants 120 are shown as being in wireless communication with the network 114. In alternative embodiments, a connection between the plurality of participants 120 and the network 114 is a wired connection. Further illustrated, a participant of the plurality of participants 120 includes a user 126, a user 130, a user 132, a group or "talk group" 122, a group 124, and a group 128. In general, a participant comprises any combination of the following: one or more individual users that are members of a specific group, one or more individual users that are not members of a specific group, a group including a plurality of users, and a plurality of groups. Thus by way of illustration, also shown in FIG. 1, the user 126 is a member of the group 124; and users 130 and 132 are not members of a talk group. A "group", as used herein, includes any arbitrary collection of participants. The group is either established on an ad hoc basis or determined prior to a communication session or "predetermined".

Further, in embodiments comprising a PoC communication system a participant referred to as a PoC user or PoC group. Illustratively, each PoC user participates in a PTT or PoC communication session by way of a hardware device or user equipment (UE) also commonly referred to as communication devices, client entities, access devices, access terminals, mobile stations, mobile subscriber units, mobile devices, and the like. In various embodiments, the UE comprises a terminal such as a mobile handset, a cellular phone, a personal digital assistant (PDA), a computer, as well as any other combination of software/firmware and hardware useful for engaging in a PTT communication session. Illustratively for a PoC communication system the UE includes a PoC client, which is a functional entity for providing the PoC user with access to a PoC service. Access to the PoC service enables participation in PoC communication sessions.

Each participant including the users 126, 130, 132 and the groups 122, 124, 128, as well as other participants shown but not explicitly identified, maintain a link via the UE to the server 110 through the network 114 by a SIP dialog comprising SIP signaling. In an illustrative PoC communication session, the SIP dialog is used to initiate/terminate the session and modify the session, such as by adding/removing participants and by enforcing a set of privacy rules for the communication session. In further embodiments wherein the communication system 100 comprises a PoC communication system, the network 114 includes a SIP/IP core that, among others, manages routing of the SIP dialog between the PoC client and the PoC server. In at least one embodiment, a media stream (e.g., including media such as voice, data, video, text, etc.) is transmitted between a participant UE and the server 110 through the network 114 by using RTP.

In various embodiments, it is desirable for one of the participants to hide the participant's identity from one or more of the other participants of a communication session. Consider the following illustration where a PoC communication session has been established in response to a collaborative incident such as, for example, a seizure of illegal drugs. Accordingly, a plurality of participants of the PoC communication session comprises law enforcement officers from multiple jurisdictions having different ranks and authorizations, among others. While the PoC communication session is active, one law enforcement officer adds a narcotics expert from one of the participating jurisdictions to join in an on-going discussion.

However, the law enforcement officer that is adding the narcotics expert does not want the identity of the narcotics expert to be revealed to all current participants of the on-going communication session. Conversely, the law enforcement officer that is adding the narcotics expert to the communication session does not want the identities of all of the current participants to be provided to the narcotics expert. Thus, the law enforcement officer that is adding the narcotics expert wants to selectively provide the identity of the narcotics expert to a subset of all of the current participants of the communication session. Similarly, the law enforcement officer that is adding the narcotics expert wants to selectively provide the identity of a subset of all the current participants of the communication session to the narcotics expert.

To accomplish such a selective sharing of identity information, the law enforcement officer uses his UE to implement at least one of a plurality of embodiments as described in the present disclosure. In a general embodiment, the law enforcement officer adding the narcotics expert expressly identifies via his UE the subset of all of the current participants of the communication session with which to share the identity of the narcotics expert. In a similar embodiment, the law enforcement officer adding the narcotics expert explicitly identifies via his UE the subset of all of the current participants of the communication session whose identities are shared with the narcotics expert.

Figure 2:
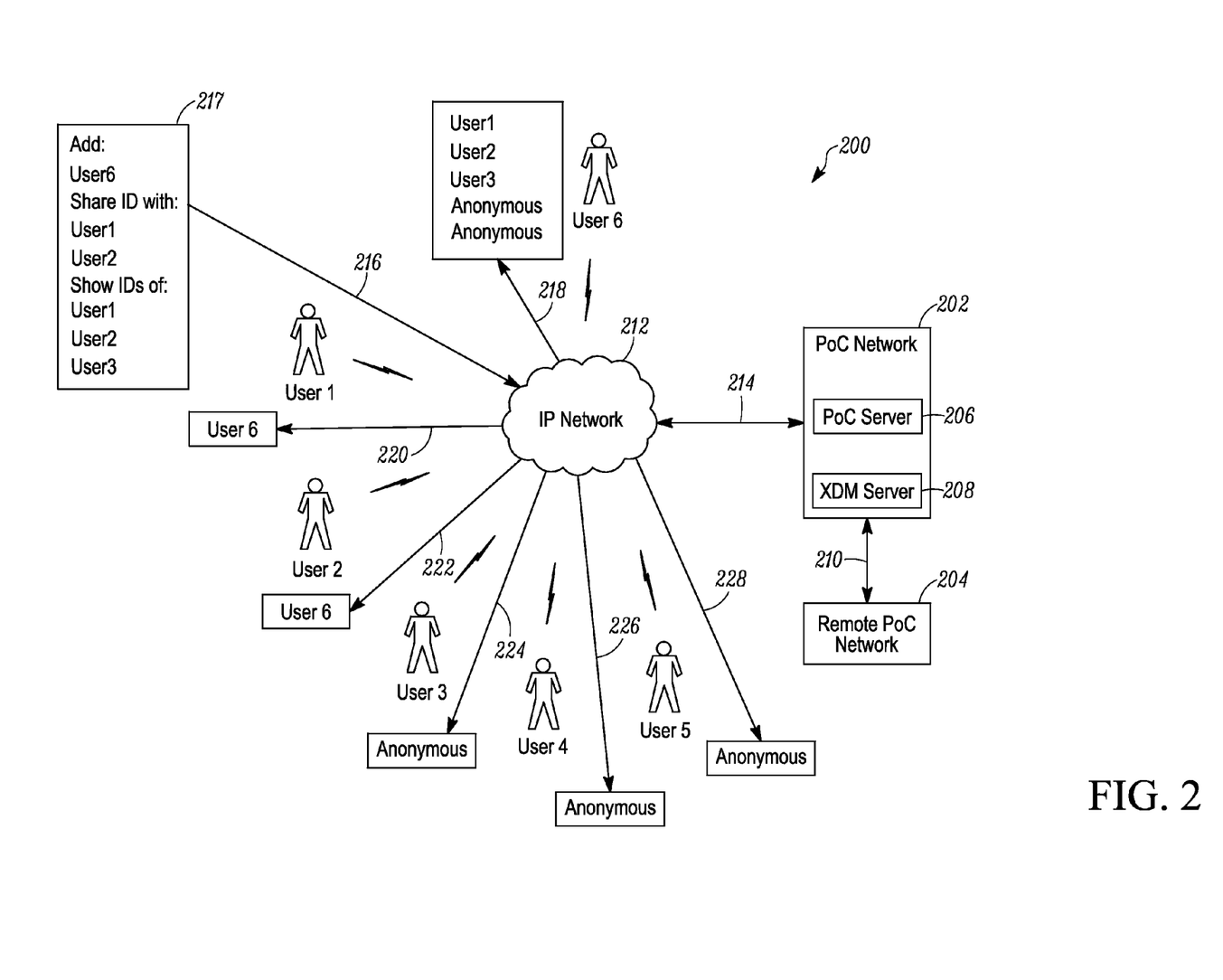
FIG. 2 illustrates a communication system and method in accordance with at least one embodiment.

The previous example is described herein with reference to FIG. 2. Specifically, FIG. 2 shows a PoC communication system 200 including a local PoC network 202 and a remote PoC network 204 in communication with the local PoC network 202 as indicated by an arrow 210. The local PoC network 202 includes a PoC server 206 and an XML document management server (XDM) 208. In some embodiments, at least one of the participant identity information, the privacy profiles, the privacy lists, and the privacy rules are stored in one or more XML documents within the XDM 208. The local PoC network 202 is coupled to an IP network 212 as indicated by an arrow 214.

A plurality of users including a user 1, a user 2, a user 3, a user 4, a user 5, and a user 6 are in wireless communication with one another via the IP network 212 using their UE (not shown). Therefore, the UE of the plurality of users maintain a link to the PoC network 202, and thus the PoC server 206, by way of the IP network 212. In some embodiments, one or more of the users 1-6 via their UE are in communication with the remote PoC network 204, for example, by way of a connection as indicated by the arrow 210. In other embodiments, at least one remote user via her UE is in communication with the remote PoC network 204, for example, by way of a remote IP network. Further, in some embodiments, the at least one remote user via her UE is in communication with the local PoC network 202 by the connection as indicated by the arrow 210.

With reference to the continuing illustration regarding the seizure of illegal drugs, consider that the users 1-5 are actively involved in an on-going communication session, and the user 1 is the law enforcement officer that adds the narcotics expert or the user 6. The user 1 makes a request via SIP signaling generated at his UE, for example to the PoC server 206, to add the user 6. As such, the user 1 identifies, e.g., in the request or some other supplementary signaling to the request, the subset of all of the current participants 1-5 of the on-going communication session with which to share an identity of the user 6. Similarly, when the user 1 makes the request to add the user 6, the user 1 identifies the subset of all of the current participants 1-5 of the on-going communication session whose identities are shared with the user 6.

The identifications made by the user 1 are established as privacy rules related to the user 6 in the on-going PoC communication session and control how the PoC server shares identity information of the participants of the communication session. Thus, in this embodiment, the privacy rules established by the POC server related to the user 6 are based on the request by being inclusive of the privacy rules established by the user 1 and sent with the request to add user 6.

The privacy rules related to the user 6 as established by the user 1 override any privacy rules and privacy settings that are requested by the user 6 when joining the on-going communication session. For example, the OMA PoC standards enable a participant to request anonymity when joining a communication session; however, any such anonymity requests made by the user 6 are ignored in favor of the privacy rules related to the user 6 as established by the user 1. In another aspect, as discussed below, the user 1 can establish privacy rules related to the user 6 that include allowing the user 6 to use requested privacy rules and privacy settings. Generally, in various embodiments, a request to add an additional user "directs" a communication server to establish a set of privacy rules related to the additional user. For example, the request by the user 1 to add the user 6 directs the PoC server 206 to establish the privacy rules related to the user 6.

Specifically referring to FIG. 2, the user 1 makes the request to the PoC server 206 to add the user 6 as indicated by an arrow 216. In various embodiments, a participant in a PoC communication session is addressed by a SIP uniform resource identifier (SIP URI), which takes a general form of user@domain. In other embodiments, a participant in a PoC communication session is addressed by a telephone URI (TEL URI), which allows a participant to be addressed using a telephone number. In embodiments wherein a TEL URI is used to address a participant, the PoC client transmits the TEL URI to a SIP/IP core, for example in the IP network 212, wherein the SIP/IP core resolves the TEL URI to a SIP URI.

The request to add the user 6 is summarized in a block 217. Specifically, the request to add the user 6 specifies: adding the user 6 to the on-going communication session; sharing the identity of the user 6 with the user 1 and the user 2; and sharing an identity of the user 1, an identity of the user 2, and an identity of the user 3 with the user 6. For example, the user 1 and the user 2 are police chiefs in their respective jurisdictions and therefore have either a predetermined rank or role that is required for receiving or "seeing" the identity of the user 6. As used herein, the terms "see" or "seeing" refer to sharing an identity; thus, if a user 'x' shares his/her identity with a user 'y', then the user 'y' sees the identity of the user 'x' on a user interface of the UE.

Further, if the user 'x' does not share his/her identity with the user 'y', then the user 'y' sees the user 'x' as a hidden or anonymous user. In the illustration, the identity of the user 6 is not shared with the user 3, the user 4, and the user 5. Therefore, the users 3-5 only see that an anonymous user is added to the on-going communication session. Likewise, an identity of the user 4 and an identity of the user 5 are not shared with the user 6. Therefore, the user 6 sees the users 4-5 as anonymous users. In some embodiments, the absence of a specific request by the user 1 to share a user's identity with a different user results in the different user seeing an anonymous user.

In the illustrative request to add the user 6, the user 1 establishes a set of privacy rules related to the user 6 by identifying a permitted list that identifies the users with whom the identity of the user 6 is shared and identifies the users whose identities are shared with the user 6. Optionally, the user 1 can establish the set of privacy rules related to the user 6 by identifying a non-permitted list that identifies the users with whom the identity of the user 6 is not shared (or is withheld) and identifies the users whose identities are not shared with (or are withheld from) the user 6.

Still referring to FIG. 2, a plurality of reference arrows 218, 220, 222, 224, 226, 228 indicate a manner, as described above, in which identities are shared once the request to add the user 6 is processed by the PoC server 206 and the privacy rules related to the user 6 established by the user 1 are put into effect within the communication session. Specifically, as indicated by the arrow 218, the user 6 sees the identities of the user 1, the user 2, and the user 3, and the user 6 sees the user 4 and the user 5 as anonymous users. The arrow 220 indicates that the user 1 sees the identity of the user 6, and the arrow 222 indicates that the user 2 also sees the identity of the user 6. Moreover, the arrow 224 indicates that the user 3 sees the user 6 as anonymous; the arrow 226 indicates that the user 4 sees the user 6 as anonymous; and the arrow 228 indicates that the user 5 sees the user 6 as anonymous. Although in the previous example the user 1 is the user that established and sent to the PoC server the privacy rules related to the added user, in alternative embodiments, a different user in the on-going communication session can add an additional user and likewise establish and send to a communication server the privacy rules related to the additional user in the communication session.

Figure 3:
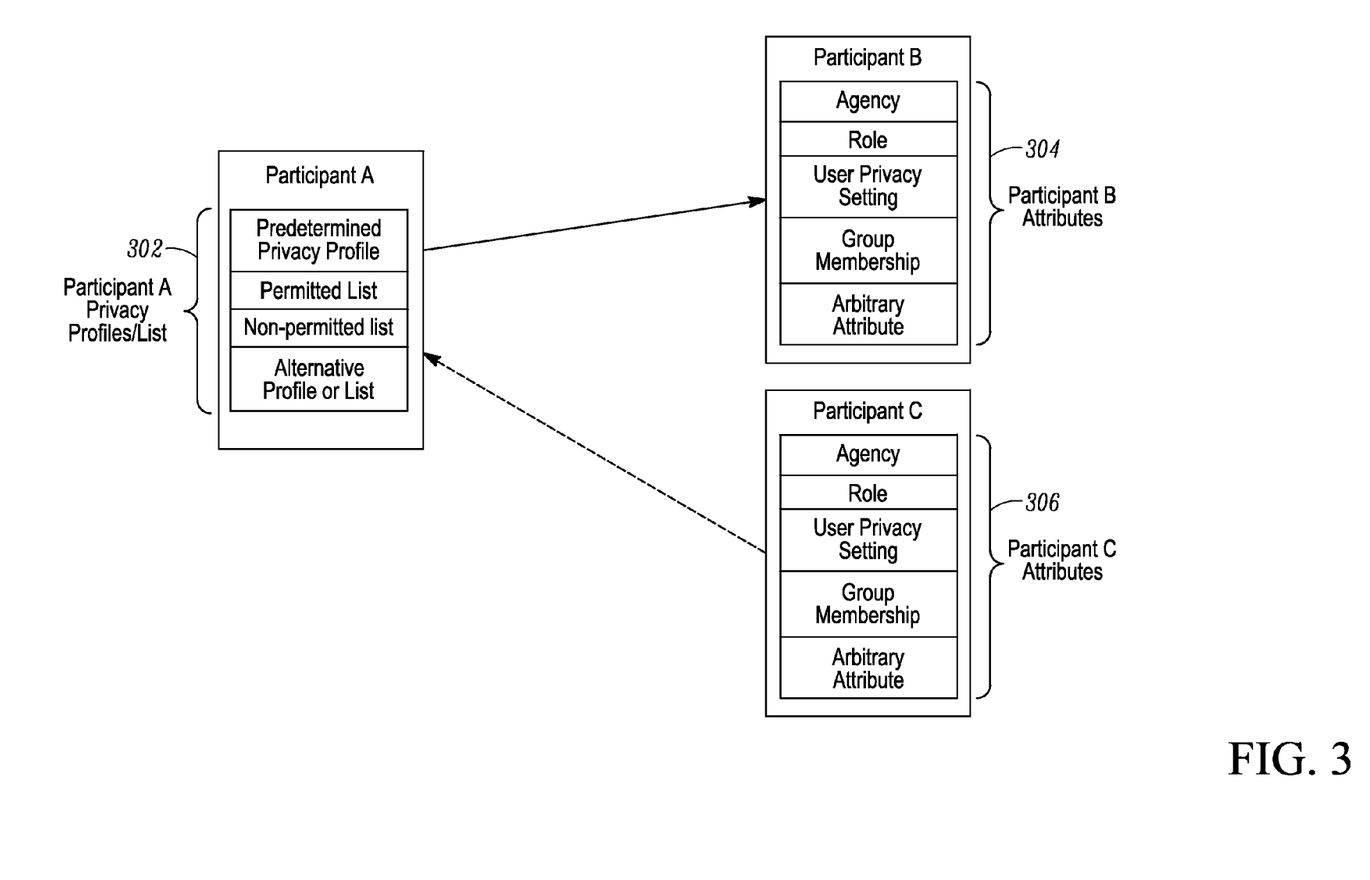
FIG. 3 illustrates a method of establishing privacy rules for a communication session in accordance with illustrative embodiments.

In various embodiments, it is not practical to require the user 1, or any user that is adding an additional user, to explicitly provide detailed information regarding identity sharing as discussed above with reference to FIG. 2. Therefore, other approaches for conveying information regarding who sees an identity of an added user and whose identities are shared with the added user are desirable. For example, FIG. 3 illustrates various methods of conveying, and thus establishing, privacy rules regarding a participant added to an on-going communication session in accordance with some embodiments. Specifically, as illustrated in FIG. 3, a participant A adds a participant B to an on-going communication session and establishes and sends a set of privacy rules related to the participant B based on one or more of: a privacy profile 302, a plurality of participant B attributes 304, or a plurality of participant C attributes 306.

The privacy profile 302 includes a plurality of entries. Illustratively, the privacy profile 302 includes, among others, a predetermined or preconfigured privacy profile, the permitted list, the non-permitted list, an alternative privacy profile and an alternative list. In some embodiments, the privacy profile 302 includes a group list. In one example, the group list includes a list of co-workers of the added participant B, a list of public safety officers having a specified rank, a list of participants that belong to a specific group such as a group of detectives or any other list as defined for the communication session. Such a group list can be customized toward the situation-specific requirements of a particular communication session, such as the requirements arising from an emergency situation.

In other embodiments, the privacy profile 302 includes a commonly used privacy profile. The commonly used privacy profile includes a list of participants with whom the identity of the participant B is shared and identifies the participants whose identities are shared with the participant B. Illustratively, the commonly used privacy profile is associated with a talk group and/or is globally applied to any group and communication session. Moreover, in other illustrative implementations, the privacy profile 302 is stored, for instance, in one or more XML documents within an XDM of a local network, in one or more XML documents within a remote PoC network, in a memory of the participant A's UE, or in a memory within any combination of a PoC server, a PoC network, and an IP network.

As shown in FIG. 3, the plurality of participant B attributes 304 includes a plurality of entries such as, among others, an agency, a role, a user privacy setting, a group membership, and any other arbitrary participant attribute. For example, the agency includes a government, military, law enforcement, or fire and rescue agency. The role, illustratively, includes an official hierarchical rank such as captain, sergeant, commander, chief, an occupational function such as a detective, a police officer, and any other job function as is defined for use in the communication session. The user privacy setting includes a privacy setting that is selected by a participant when joining a communication session, for example as provided by the OMA PoC standards. Illustratively, the participant A establishes privacy rules related to the participant B by subsequently either enabling or disabling the privacy setting initially selected by participant B when joining the communication session. The group membership includes a group name or other indicator or identifier for signifying a participant's membership in the group.

In some embodiments, the participant B attributes 304 are stored in one or more XML documents within an XDM of any combination of a local and remote PoC network. In other embodiments, the participant B attributes 304 are stored in a memory of the participant B's UE. In yet other embodiments, the participant B attributes 304 are stored in a memory within a combination of a PoC server, a PoC network, and an IP network.

As shown in FIG. 3, the plurality of participant C attributes 306 includes a plurality of entries having names that are similar to the plurality of entries for the plurality of participant B attributes 304. Illustratively, in one example, the participant C has an 'agency' entry in the plurality of participant C attributes 306 that indicates a government agency whereas, by contrast, the participant B has an 'agency' entry in the plurality of participant B attributes 304 that indicates a law enforcement agency.

Optionally, while adding the participant B to the communication session in the continuing illustration, the participant A uses one or more of the plurality of participant B attributes 304 to establish the set of privacy rules related to the participant B within the on-going communication session. For example, if the participant A sees that the 'role' of the participant B includes a rank of chief of police, then in some embodiments, the participant establishes a set of privacy rules related to the participant B that include allowing the participant B to see an identity of every other participant of the communication session, and additionally permitting every participant of the communication session to see the identity of the participant B.

In some embodiments, the participant A uses one or more of the plurality of participant C attributes 306 to establish the set of privacy rules related to the participant B while adding participant B to the communication session. For example, referring to the illustration as described with reference to FIG. 2, the user 1 (e.g., the law enforcement officer) that adds the user 6 (e.g., the narcotics expert) indicates that the privacy rules for identity sharing associated with another user of the on-going communication session (e.g., any of the users 2-5) be applied to the user 6. As one example, if the identity of the user 5 is shared with the user 2, then the identity of the user 6 is also shared with the user 2. Likewise, if the user 5 sees the identity of the user 3, then the user 6 also sees the identity of the user 3.

Figure 4:
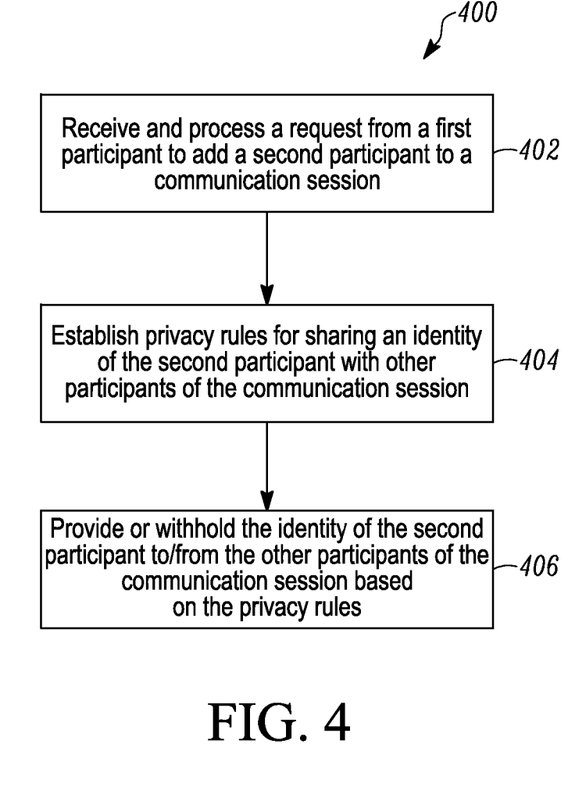
FIG. 4 is a logical flowchart showing an illustrative method for sharing an identity of a participant added to a communication session in accordance with some embodiments.
Figure 5:
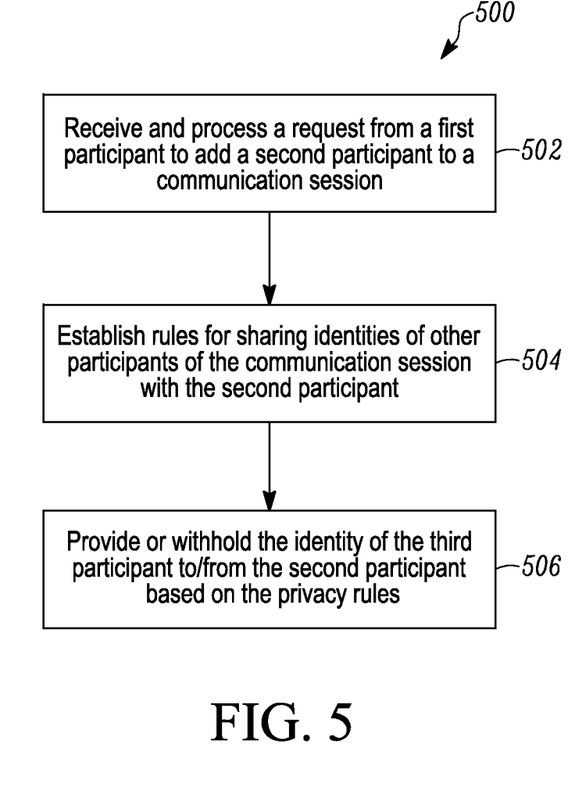
FIG. 5 is a logical flowchart showing an illustrative method for sharing an identity of a participant in a communication session in accordance with some embodiments.

FIG. 4 and FIG. 5 each show a logical flowchart illustrating a method (400 and 500, respectively) for sharing identity information of participants to a communication session in accordance with some embodiments of the present disclosure. In an embodiment, the methods are performed at a communication server, for instance a PoC server. In accordance of the method 400 shown in FIG. 4, an identity of a participant added to a communication session is shared. The communication server receives and processes a request from a first participant to add a second participant to a communication session (at a block 402). The participant includes any combination of one or more individual users that are apart from a specific group, a group including a plurality of users, and a plurality of groups. Further, the request may or may not include therewith some privacy rules related to the added participant that were established by the first participant (as described, for instance, by reference to FIGS. 2 and 3).

The communication server, based on the request, establishes a set of privacy rules related to the second participant (at a block 404), which control the manner by which an identity of the second participant is shared with other participants of the communication session. Using these established privacy rules, the communication server determines whether and when to provide or withhold the identity of the second participant to the other participants of the communication session (at a block 406).

Similarly, in accordance of the method 500 shown in FIG. 5 an identity of one or more current participants to a communication session is shared with an added participant. The communication server receives and processes a request from a first participant to add a second participant to a communication session (at a block 502). Illustratively, the participant includes any combination of one or more individual users that are apart from a specific group, a group including a plurality of users, and a plurality of groups. Further, the request may or may not include therewith some privacy rules related to the added participant that were established by the first participant (as described, for instance, by reference to FIGS. 2 and 3).

The communication server, based on the request, establishes a set of privacy rules related to the second participant (at a block 504), which control the manner in which identities of current participants of the communication session are shared with the second added participant. For example, using these established privacy rules, the communication server determines whether and when to provide or withhold an identity of one or more current participants (e.g., a third participant) of the communication session to the second (added) participant (at a block 506).

Figure 6:
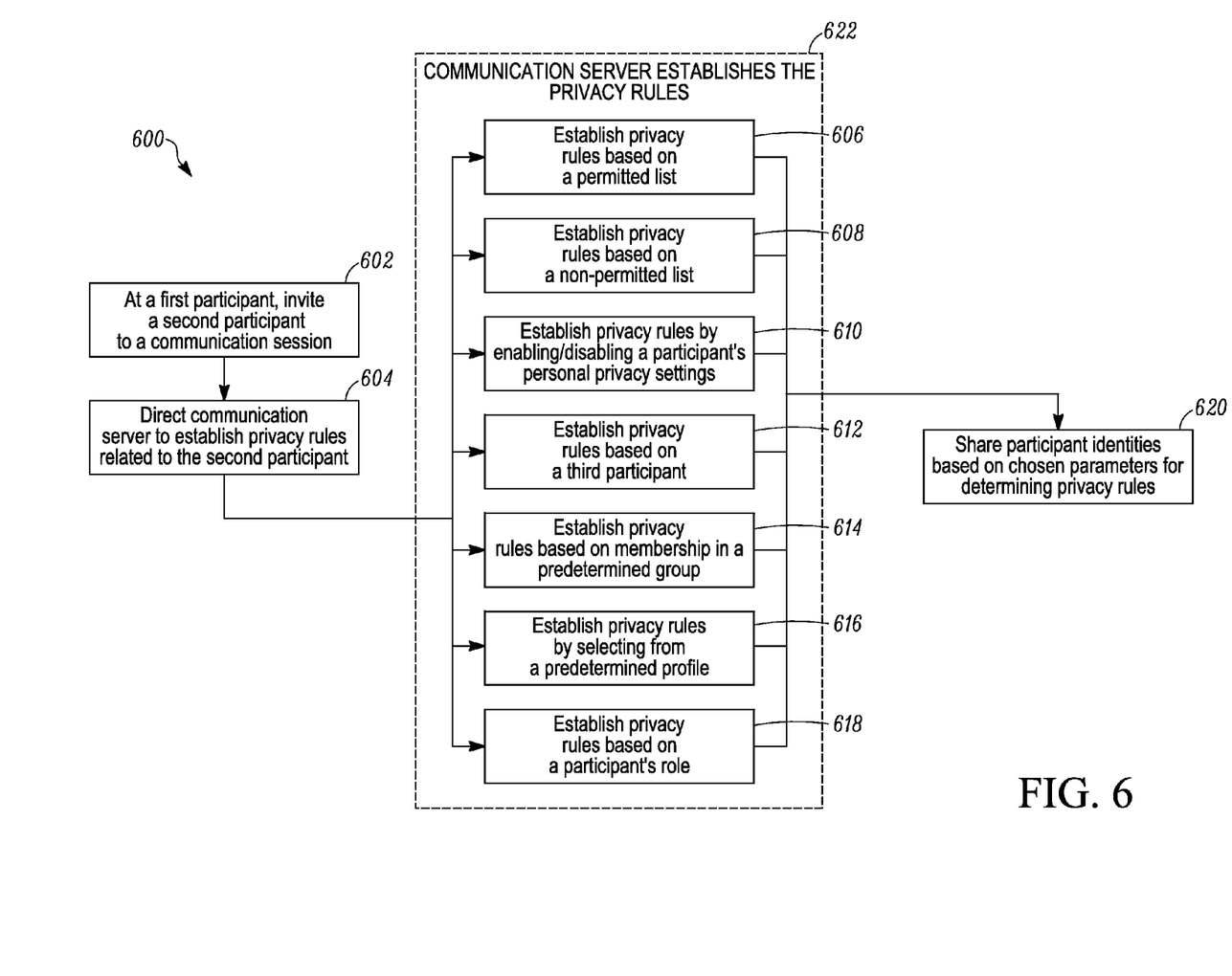
FIG. 6 is a logical flowchart showing an illustrative method for establishing privacy rules in a communication session in accordance with some embodiments.

Referring to FIG. 6, and in accordance with some embodiments, a logical flowchart illustrates a method 600 for establishing and implementing privacy rules in a communication session. Accordingly, upon starting, a first participant invites a second participant to a communication session (at a block 602). The first participant further direct a communication server, at block 604, to establish privacy rules related to the added second participant. The directing 604 may provide for the inclusion of privacy rules that the first participant has established and sent to the communication server with the request (such as in accordance with the embodiments described by reference to FIGS. 2 and 3). Alternatively, or in addition, the directing 604 may be for an autonomous establishing of the privacy rules by the communication server without further input from the first participant other than the request to add the participant, such as where the request contains some bits that indicate that such privacy rules for the added participant need to be established.

The communication server establishes the privacy rules for the added participant, at block 622, based on one or more of a plurality of parameters, as illustrated in blocks 606, 608, 610, 612, 614, 616, 618. For example, at block 606, the set of privacy rules are established based on a permitted list. At block 608, the set of privacy rules are established based on a non-permitted list. At block 610, the set of privacy rules are established by enabling a user privacy setting, such as a privacy setting that is selected by a participant when joining a communication session. Optionally, the set of privacy rules are established by disabling the user privacy setting. In some embodiments, the participant includes a plurality of privacy settings that can be used to establish the set of privacy rules.

At block 612, the set of privacy rules are established based on an attribute of another participant of the communication session. At block 614, the set of privacy rules are established based on the second participant's membership in a particular group. At block 614, the set of privacy rules are established based on group memberships of other participants of the communication session. At block 616, the set of privacy rules are established based on a predetermined/pre-stored/preconfigured privacy profile and/or privacy list. Finally, at block 618, the set of privacy rules are established based on the second participant's role, such as for example a rank. While specific parameters of establishing the set of privacy rules have been described herein, it is understood that other parameters, based on any of a plurality of arbitrary profiles, lists, participant attributes or other attributes of the communication session, can be equally used without departing from the scope of the present disclosure.

After the set of privacy rules related to the second participant are established, for example as illustrated in the plurality of blocks 606, 608, 610, 612, 614, 616, 618, the communication server shares participant identities (at a bock 620) based on the established privacy rules. In particular, an identity of the second participant is shared with other participants of the communication session in accordance with the chosen parameters for establishing the privacy rules related to the second participant. Moreover, identities of participants of the communication session are shared with the second participant in accordance with the chosen parameters for establishing the privacy rules related to the second participant.

Figure 7:
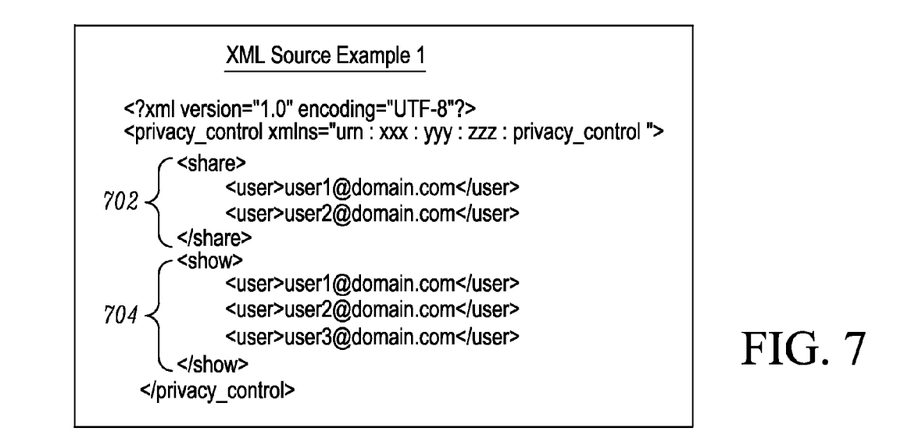
FIG. 7 illustrates an extensible markup language (XML) computer-readable code in accordance with some embodiments.
Figure 8:
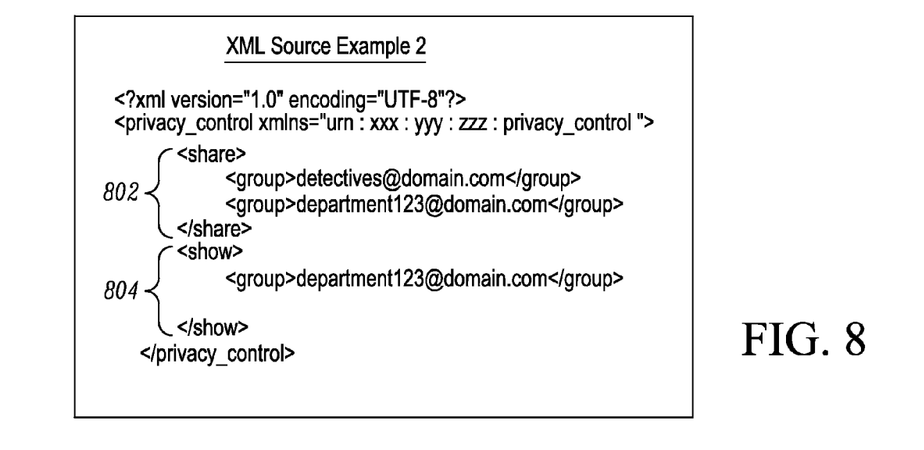
FIG. 8 illustrates an XML computer-readable code in accordance with other embodiments.
Figure 9:
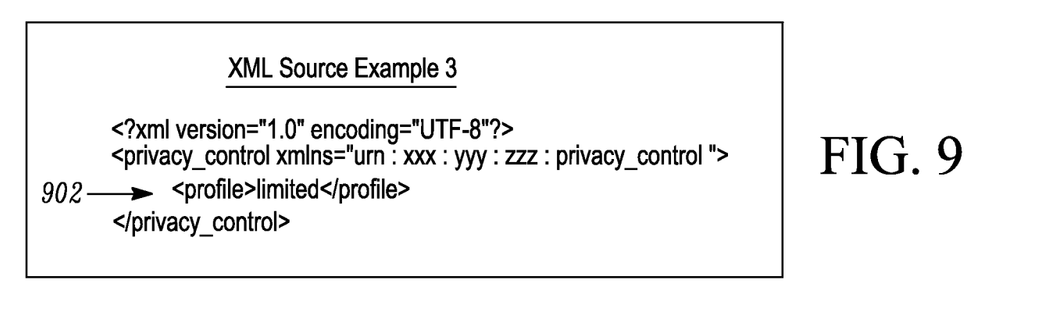
FIG. 9 illustrates an XML computer-readable code in accordance with yet other embodiments.

FIGS. 7-9 illustrate examples of XML computer-readable code in accordance with various embodiments. The XML code, as described herein, is executed by one or more general-purpose computers. In some embodiments, the one or more general-purpose computers comprise portions of a server such as a PoC server, a network such as a PoC network, and/or an IP network. Illustratively, the XML code is stored within XML documents in a database in an XML document management server (XDM) of a PoC server, and the XML code is executed by one or more devices for operating computer-readable media.

As an illustration, consider that a SIP REFER message is used to add a participant to a communication session. In particular, FIG. 7 illustrates an XML source code that is embedded, for example, in an XML body of the SIP REFER message. The XML source code, as shown in FIG. 7, specifically determines that an identity of the added participant is specifically shared with a user 1 and a user 2 (at a code segment 702). In like manner, the XML source code specifically determines that the added participant specifically sees an identity of the user 1, the user 2, and a user 3 (at a code segment 704). Thus, a set of privacy rules related to the added participant is established.

FIG. 8 also illustrates an XML source code that is embedded, for example, in an XML body of the SIP REFER message. The XML source code, as shown in FIG. 8, specifically determines that an identity of the added participant is shared with a 'detectives' group and a 'department123' group (at a code segment 802). Similarly, the XML source code determines that the added participant specifically only sees an identity of the 'department123' group (at a code segment 804). The set of privacy rules related to the added participant is therefore established based on a set of predetermined group memberships.

FIG. 9 illustrates an XML source code that is embedded, for example, in an XML body of the SIP REFER message. The XML source code, as shown in FIG. 9, determines that a predetermined 'limited' privacy profile is used to establish the set of privacy rules related to the added participant (at a code segment 902). Thus, a set of privacy rules related to the added participant is established based on the predetermined 'limited' privacy profile.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling privacy in an on-going communication session, the method comprising:
   at a communication server:
   processing a request from a first participant of the on-going communication session to add a second participant to the on-going communication session, wherein the request further directs the communication server to establish a set of privacy rules related to the second participant; and
   establishing the set of privacy rules related to the second participant, which controls sharing of identity information between the second participant and a third participant of the on-going communication session, wherein the establishing the set of privacy rules related to the second participant is performed based on the request from the first participant and wherein the established set of privacy rules override any privacy rules and privacy settings that are requested by the second participant when joining the on-going communication session.

2. The method of claim 1 further comprising:
   providing an identity of the second participant to the third participant based on the set of established privacy rules.

3. The method of claim 1 further comprising:
   providing the identity of the third participant to the second participant based on the set of established privacy rules.

4. The method of claim 1, wherein establishing the set of privacy rules comprises defining a non-permitted list that identifies at least one participant of the on-going communication session that is withheld from receiving an identity of the second participant.

5. The method of claim 1, wherein establishing the set of privacy rules comprises defining a non-permitted list that identifies at least one participant of the on-going communication session having an identity that is withheld from the second participant.

6. The method of claim 1, wherein establishing the set of privacy rules comprises defining a permitted list, which identifies at least one of:
   at least one participant, but fewer than all participants, of the on-going communication session to receive an identity of the second participant; and
   at least one participant, but fewer than all participants, of the on-going communication session having an identity that is provided to the second participant.

7. The method of claim 1, wherein establishing the set of privacy rules comprises selecting at least one of: a participant privacy setting; a plurality of participant privacy settings; a privacy profile; or a plurality of privacy profiles.

8. The method of claim 1, wherein establishing the set of privacy rules comprises assigning, to the second participant, a privacy setting related to the third participant.

9. The method of claim 1, wherein the on-going communication session includes at least one group, and wherein establishing the set of privacy rules comprises assigning, to the second participant, a privacy setting of the at least one group.

10. The method of claim 1, wherein the second participant has an attribute, and wherein establishing the set of privacy rules comprises assigning, to the second participant, a privacy setting based on the attribute.

11. A method for sharing participant identity information in an on-going communication session, the method comprising:
   at a user equipment of a first participant of the on-going communication session:
   inviting a second participant to the on-going communication session; and
   directing a communication server to establish a set of privacy rules related to the second participant, which control sharing of identity information between the second participant and at least one other participant of the on-going communication session, and wherein the set of privacy rules override any privacy rules and privacy settings that are requested by the second participant when joining the on-going communication session.

12. The method of claim 11, wherein the set of privacy rules determine at least one of:
   whether to provide identity information related to the second participant to the at least one other participant of the on-going communication session;
   whether to provide identity information related to the at least one other participant to the second participant; and
   wherein the at least one other participant comprises fewer than all participants of the on-going communication session.

13. The method of claim 11, wherein the set of privacy rules comprises selecting at least one of a participant privacy setting or a privacy profile.

14. The method of claim 11, wherein the set of privacy rules is established based on an attribute of the second participant.

15. The method of claim 11, wherein the set of privacy rules is established based on an attribute of the at least one other participant of the on-going communication session.

16. A system for controlling privacy in an on-going communication session, the system comprising:
   a database that maintains identity information for a plurality of participants of the on-going communication session;
   an interface that receives a request, from a first active participant of the plurality of participants, to include an additional participant in the on-going communication session, wherein the request further directs the interface to establish a set of privacy rules related to the additional participant; and
   a processing device that, responsive to receiving the request, establishes the set of privacy rules related to the additional participant, which control sharing of identity information between the additional participant and a second active participant of the plurality of participants, and wherein the set of privacy rules override any privacy rules and privacy settings that are requested by the second participant when joining the on-going communication session.

17. The system of claim 16, wherein the system is a push to talk over cellular (PoC) server.

18. The system of claim 16, wherein the database further maintains a permitted list, which identifies at least one of:
   at least one participant, but fewer than all participants, of the on-going communication session to receive an identity of the second participant; and
   at least one participant, but fewer than all participants, of the on-going communication session having an identity that is provided to the second participant.

* * * * *